(12) United States Patent
Martin et al.

(10) Patent No.: US 11,761,091 B2
(45) Date of Patent: Sep. 19, 2023

(54) SURFACE ACTIVATED POLYMERS

(71) Applicants: SRG GLOBAL LIRIA, S.L., Liria (ES); AVANZARE INNOVACION TECNOLOGICA S.L., Navarrete (ES)

(72) Inventors: Urko Martin, Liria (ES); Miguel Ventura, Liria (ES); Manuel Pastor, Liria (ES); Rebeca Negron Canovas, Liria (ES); Julio Gomez Cordon, Navarrete (ES); Luis Otano Jiminez, Navarrete (ES); Javier Perez Martinez, Navarrete (ES)

(73) Assignees: SRG GLOBAL LIRIA, S.L., Liria (ES); AVANZARE INNOVACION TECHNOLOGICA S.L., Navarrete (ES)

( * ) Notice: Subject to any disclaimer, the term of this patent is extended or adjusted under 35 U.S.C. 154(b) by 461 days.

(21) Appl. No.: 16/651,768

(22) PCT Filed: Sep. 28, 2018

(86) PCT No.: PCT/EP2018/076427
§ 371 (c)(1),
(2) Date: Mar. 27, 2020

(87) PCT Pub. No.: WO2019/063773
PCT Pub. Date: Apr. 4, 2019

(65) Prior Publication Data
US 2020/0255947 A1    Aug. 13, 2020

(30) Foreign Application Priority Data
Sep. 28, 2017   (ES) ................ ES201731155

(51) Int. Cl.
C23C 18/30       (2006.01)
C23C 18/12       (2006.01)
(Continued)

(52) U.S. Cl.
CPC .............. C23C 18/24 (2013.01); C09K 13/10 (2013.01); C23C 18/122 (2013.01);
(Continued)

(58) Field of Classification Search
CPC ... C23C 18/24; C23C 18/122; C23C 18/1641; C23C 18/1653; C23C 18/2066;
(Continued)

(56) References Cited

U.S. PATENT DOCUMENTS 2,748,069 A   5/1956  Iexi
3,379,556 A   4/1968  Chiecchi
(Continued)

FOREIGN PATENT DOCUMENTS

BE    744425 A    6/1970
CN    1966765 A   5/2007
(Continued)

OTHER PUBLICATIONS

Extended European Search Report and Opinion received for EP Application No. 21150614.2, dated Sep. 30, 2021, 15 pages.
(Continued)

*Primary Examiner* — Dah-Wei D. Yuan
*Assistant Examiner* — Nga Leung V Law

(57) ABSTRACT

An aqueous composition for use in activating surface of polymers.

21 Claims, 2 Drawing Sheets

(51) Int. Cl.
  *C23C 18/28* (2006.01)
  *C23C 18/32* (2006.01)
  *C23C 18/38* (2006.01)
  *C23C 18/24* (2006.01)
  *C23C 18/20* (2006.01)
  *C23C 18/16* (2006.01)
  *C25D 3/38* (2006.01)
  *C25D 5/56* (2006.01)
  *C09K 13/10* (2006.01)

(52) U.S. Cl.
  CPC ...... *C23C 18/1641* (2013.01); *C23C 18/1653* (2013.01); *C23C 18/2066* (2013.01); *C23C 18/2086* (2013.01); *C23C 18/28* (2013.01); *C23C 18/30* (2013.01); *C25D 3/38* (2013.01); *C25D 5/56* (2013.01); *C09K 2211/183* (2013.01); *C23C 18/32* (2013.01); *C23C 18/38* (2013.01); *C23C 2222/10* (2013.01)

(58) Field of Classification Search
  CPC ..... C23C 18/2086; C23C 18/28; C23C 18/30; C23C 18/32; C23C 18/38; C23C 18/54; C23C 2222/10; C23C 2222/20; B05D 3/101; C09K 13/10; C09K 2211/183; C25D 3/38; C25D 5/56
  See application file for complete search history.

(56) References Cited

U.S. PATENT DOCUMENTS

| | | | |
|---|---|---|---|
| 3,708,430 | A | 1/1973 | Kadison et al. |
| 3,787,326 | A | 1/1974 | Deyrup |
| 3,795,622 | A | 3/1974 | Dutkewych |
| 3,869,488 | A | 3/1975 | Bride |
| 3,900,689 | A | 8/1975 | Deyrup |
| 3,962,497 | A | 6/1976 | Doty et al. |
| 4,078,980 | A | 3/1978 | Harris et al. |
| 4,151,126 | A | 4/1979 | Adelman et al. |
| 4,351,971 | A | 9/1982 | Kanemaru et al. |
| 4,568,571 | A | 2/1986 | Sriniyan et al. |
| 4,636,572 | A | 1/1987 | Hudson et al. |
| 4,644,073 | A | 2/1987 | Mumallah et al. |
| 4,963,687 | A | 10/1990 | Saito et al. |
| 5,180,639 | A | 1/1993 | Zarnoch |
| 5,264,288 | A | 11/1993 | Das et al. |
| 5,904,797 | A | 5/1999 | Kwei |
| 5,928,727 | A | 7/1999 | Timmer |
| 5,962,073 | A | 10/1999 | Timmer |
| 6,352,587 | B1 | 3/2002 | Staffel et al. |
| 6,559,242 | B1 | 5/2003 | Ball et al. |
| 7,314,671 | B1 | 1/2008 | Preikschat et al. |
| 8,603,352 | B1 | 12/2013 | Zhang-Beglinger et al. |
| 9,922,951 | B1 * | 3/2018 | Bahl .................. C23C 18/1608 |
| 10,501,852 | B2 | 12/2019 | Gomez Cordon et al. |
| 2004/0182714 | A1 * | 9/2004 | Imori ................. C23C 18/1879 205/123 |
| 2005/0147755 | A1 | 7/2005 | Imori et al. |
| 2007/0099425 | A1 | 5/2007 | Schildmann et al. |
| 2007/0269680 | A1 | 11/2007 | Kawamura et al. |
| 2008/0014362 | A1 | 1/2008 | Kawamura et al. |
| 2009/0023011 | A1 | 1/2009 | Chaffins et al. |
| 2009/0192251 | A1 * | 7/2009 | Chung ................. C23C 18/122 524/417 |
| 2011/0236565 | A1 * | 9/2011 | Piano ..................... C23C 18/44 106/1.05 |
| 2012/0196441 | A1 * | 8/2012 | Mevellec ............... C23C 18/32 438/770 |
| 2013/0186774 | A1 | 7/2013 | Pearson et al. |
| 2016/0145759 | A1 | 5/2016 | Toi et al. |
| 2018/0069203 | A1 | 3/2018 | Takahagi |
| 2018/0076422 | A1 | 3/2018 | Amano et al. |
| 2018/0076423 | A1 | 3/2018 | Kokuryo et al. |
| 2018/0090724 | A1 | 3/2018 | Miyazaki et al. |
| 2018/0208844 | A1 | 7/2018 | Pearson et al. |
| 2020/0080203 | A1 | 3/2020 | Gomez Cordon et al. |
| 2021/0275998 | A1 | 9/2021 | Xu et al. |
| 2022/0059889 | A1 | 2/2022 | Sasaki et al. |

FOREIGN PATENT DOCUMENTS

| | | |
|---|---|---|
| CN | 101892470 A | 11/2010 |
| CN | 103531825 A | 1/2014 |
| CN | 104651823 A | 5/2015 |
| DE | 1951717 A1 | 5/1970 |
| DE | 19740431 C1 | 11/1998 |
| EP | 3081129 A1 | 6/1983 |
| EP | 3181726 A1 | 6/2017 |
| ES | 2282278 T3 | 10/2007 |
| GB | 996326 A | 6/1965 |
| GB | 1361760 A | 7/1974 |
| JP | S4870689 A | 9/1973 |
| JP | S5152384 A | 5/1976 |
| JP | H03115584 A | 5/1991 |
| JP | 2005001387 A | 1/2005 |
| JP | 2007126745 A | 5/2007 |
| JP | 2008126413 A | 6/2008 |
| JP | 2008519138 A | 6/2008 |
| JP | 2008156702 A | 7/2008 |
| JP | 2009137055 A | 6/2009 |
| JP | 2010023339 A | 2/2010 |
| JP | 2011026564 A | 2/2011 |
| JP | 2011079304 A | 4/2011 |
| JP | 2012126123 A | 7/2012 |
| JP | 2013001854 A | 1/2013 |
| SU | 1633016 A1 * | 3/1911 |
| SU | 1633016 A1 | 3/1991 |
| SU | 1633016 A1 | 3/1991 |
| WO | 2016136914 A1 | 9/2016 |
| WO | 2019063773 A1 | 4/2019 |
| WO | 2019063859 A1 | 4/2019 |

OTHER PUBLICATIONS

Office action received for Chinese application No. 201880063410.7 dated Jan. 14, 2022, 17 pages (09 pages of English translation and 08 pages of official notification).
CN office action received for application No. 201880063319.5 dated Jan. 4, 2022, 18 pages (10 pages of English translation and 08 pages of Official notification).
Wikipedia "Thermostability", Feb. 12, 2019, pp. 1-5, http://en.wikipedia.org/wiki/Thermostability.
Hamm, R.E., et al., "Complex Ions of Chromium. III. Reactions between Hexaquochromium (III) and Oxalate Ions" J. Am. Chem. Soc., 1953, 75, pp. 3085-3089 (Abstract only).
International Search Report and Written Opinion for International Application No. PCT/EP2018/076427, dated Jan. 17, 2019, 18 pages.
International Search Report and Written Opinion for International Application No. PCT/ES2018/070575, dated Nov. 27, 2018, 10 pages.
International Preliminary Report on Patentability for International Application No. PCT/EP2018/076427, dated Mar. 31, 2020, 13 pages.
International Preliminary Report on Patentability for International Application No. PCT/ES2018/070575, dated Mar. 31, 2020, 4 pages.
EP office action for EP application No. 18779657.8, dated Apr. 15, 2020, 6 pages.
Sharon Olivera et al., "Plating on acrylonitrile—butadiene—styrene (ABS) plastic review" Journal of Materials Science, 2016, vol. 51, pp. 3657-3674.
Dimitri Del Pianta et al. "Determination of the chromium(III) reduction mechanism during chromium electroplating", Electrochimica Acta, 2018, vol. 284, pp. 234-241. (Abstract Only).
IUPAC Gold Book, Thermosetting Polymer, PAC, 2004, vol. 76, 1 page.
James E. Tackett, "Characterization of Chromium(III) Acetate in Aqueous Solution", 1989, vol. 43, No. 3, pp. 490-499. (Abstract Only).

(56) References Cited

OTHER PUBLICATIONS

Randall E. Hamm, "Complex Ions of Chromium. IV. The Ethylenediaminetetraacetic Acid Complex with Chromium (III)", Jun. 8, 1953, vol. 75, pp. 5670-5672 (Abstract Only).

Roberto Giovanardi, et al. "Chromium electrodeposition from Cr(III) aqueous solutions", Surface & Coatings Technology, 2011, vol. 205, pp. 3947-3955. (Abstract Only).

Silvia Magnolis Vargas-Vasquez et al. "Characterization of Cr(III) and Cr(III) Acetate Aqueous Solutions Using UV-VIS Spectrophotometry and H NMR", Chemical Engineering Communications, 2010, vol. 197, pp. 491-505. (Abstract Only).

Fath et al., "Metallizing of plastics with virtually hexavalent chromium-free etch solutions", Plating and Surface Finishing, American Electroplaters Society,Inc., vol. 97, No. 3, pp. 171-187, Apr. 1, 2010.

Kalpakjian et al., "Manufacturing Engineering and Technology", Fourth Edition, Additives in Plastics, 2001, pp. 190-191.

Partial European search report received for EP Application No. 21150614.2, dated May 19, 2021, 17 Pages.

European search report and written opinion received for EP application No. 18862392.0, dated Jul. 14, 2021, 10 pages.

Hauserman, F. B.: "Chromium Complexes" In: "Suspensions: Fundamentals and Applications in the Petroleum Industry", American Chemical Society, vol. 23, pp. 338-356, Jan. 1, 1959.

Non Final Rejection received for U.S. Appl. No. 16/680,624, dated May 12, 2022, 14 Pages.

Chromium Complexes, Hauserman, Publication data: Suspensions: Fundamentals and Applications in the Petroleum Industry, Jan. 1, 1959 American Chemical Society, Washington, DC pp. 338-356.

Metallizing of plastics with virtually hexavalent chromium-free etch solution Fath, et al. Publication data: Plating and Surface Finishing, Apr. 1, 2010 American Electroplaters Society,Inc. East Orange, US vol. 97, Nr: 3, pp. 171-187.

* cited by examiner

MSA treated (Left is obtained at Magnification 5000X and right 600X magnification)

Conventional etching (Upper is obtained at Magnification 5000X and lower 600X magnification

Chorale morphology:
High specific Surface

Flat morphology:
Low specific Surface

SURFACE ACTIVATED POLYMERS

This application claims the benefit of the Spanish Patent Application P201731155 filed on Sep. 28, 2017.

FIELD OF THE INVENTION

The present invention generally relates to aqueous compositions for use in substrate etching, activating, plating, and/or coating; and to substrates having their surfaces etched, activated, treated, plated, and/or coated via the aqueous compositions.

BACKGROUND ART

Chemical etching of the surfaces of polymer articles prior to metallizing with an aqueous solution or so called etching bath containing hexavalent chromium and sulfuric acid is well known and is the process for making the polymer surface rough and hydrophilic as first step for polymer (e.g. plastic) surface metallization. Chemical etching is employed primarily in preparation of polymers for electroless metal plating. The polymer surfaces are normally etched to accept a chemical plating of copper or nickel being these metals in solutions where etched polymer parts are immersed. Proper adhesion of these first metal layer attached to the polymer surface is important because this metal layer permits the subsequent addition of stacked metal layers normally used in plating processes, for example, to achieve a chrome plating of the polymer.

The current polymer etching baths containing Cr(VI) are considered as toxic and carcinogenic to humans. Accordingly, using Cr(VI) is subject to strict environmental regulations.

A variety of Cr(VI)-free compositions have been suggested for use in polymer etching processes. For example, U.S. Pat. No. 8,603,352 and US20180208844 disclose use of salts of Mn(III), Mn(VI), and Mn(VII) in an acid medium and in a basic medium. However, polymers initially etched by baths containing Mn salts and subsequently metalized or coated lack desired adhesion properties. Further, they require complex washing steps due to the need to eliminate the Mn salts reduction products. Furthermore, baths containing Mn are unstable and tends to reduce to its lower oxidation states, consequently forming undesirable precipitates causing quality issues on the treated surface of the polymers.

Further bath systems have also been suggested, for example, DE1974043 discloses a bath system based on use of hydrogen peroxide; in U.S. Pat. No. 6,559,242 iron and/or copper salts have been used; U.S. Pat. No. 4,568,571 suggests use of anionic complexes with chloride ligand of transition metals; EP0081129 discloses use of organometallic complexes of transition metals in organic solvent; and US20070099425 discloses use of salts of chloride or nitrate of transition metals without the use of complexes in slightly acidic aqueous medium. However, these systems do not produce metallized or coated polymers having desired adhesion requirements demanded by various industries such as the automotive sector.

Furthermore, existing aqueous compositions used for etching polymers provide undesirable cavities having undesirable depths on the surfaces of the polymers. These cavities reduce mechanical and chemical bonding of coatings or metals to the surfaces of the polymers. In addition, due to their undesirable cavities, higher amount of coating or metal deposition is required to reach desired characteristics and appearance.

Thus, there is an existing need in the substrate surface metallization field for etching or activating aqueous compositions, which overcome the disadvantages mentioned above.

In particular, it is desirable to manufacture aqueous compositions for use in activating and/or etching surfaces of substrates and subsequently to provide metalized or coated substrates having improved adhesion property between metal layers or coating compositions and surfaces of the substrates.

Further, it is desirable to manufacture non-toxic aqueous compositions for use in activating and/or etching of surfaces of the substrates that are stable, easy to recover, recycle or eliminate under environmentally appropriate conditions.

It is also desirable to manufacture etched substrates and/or surface activated substrates having substantially flat surfaces, i.e. having reduced number of cavities and/or having cavities with smaller depths in order to increase adhesion of coatings or metals to their surface of the polymer and to reduce the amount of depositions. It is desirable to provide such kind of adhesion based on chemical bonding rather than mechanical anchoring of inlayed metal into holes.

In particular, it is desirable to manufacture plated or coated substrates having improved adhesion between surface of the substrates and a layer of metals that has been plated thereon or coating compositions that has been coated thereon.

The present invention provides such aqueous compositions, substrates, and methods that solve one or more of the problems mentioned above. Other features and advantages of the invention will be apparent from the following description and from the claims.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1A:
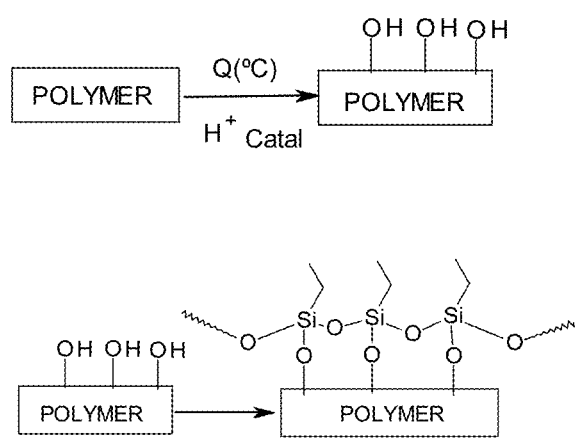
FIG. 1A-B illustrate as an example the chemical reaction between the surface of the polymer and the bifunctional molecule having the empiric formula $Si(OCH_3)_3$—$(CH_2)_3$—$SH$.

The foregoing and other aspects of the present invention will now be described in detail. The detailed description set-forth below is provided to aid those skilled in the art in practicing the present invention. However, the invention described and claimed herein is not to be limited in scope by the specific embodiments herein disclosed because these embodiments are intended as illustration of several aspects of the invention.

The embodiments set-forth below can be performed and combined with other disclosed embodiments according to the invention. Any equivalent embodiments are intended to be within the scope of this invention. Indeed, various modifications of the invention in addition to those shown and described herein will become apparent to those skilled in the art from the foregoing description which do not depart from the spirit or scope of the present inventive discovery. Such modifications are also intended to fall within the scope of the appended claims.

All publications, patents, patent applications and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present invention.

The terms "aqueous composition", "bath", and the like, unless the context clearly indicates otherwise, are used interchangeably throughout this specification. These terms as used herein refer to any liquid solution comprising water. Exemplary aqueous compositions comprise components of interest such as various acids and salts. An aqueous composition can also include additional organic components and/or inorganic components.

As used herein, the term "etching" refers to processes of removing the exposed cladding layer of a substrate (e.g. polymer) to expose the underlying layer. The term "etching" can also refer to a reduction in volume of a substrate (e.g. polymer) surface as a result of conducting a reaction thereon.

The term "plating" refers to electroless metal plating, unless the context clearly indicates otherwise. "metal deposition" and "plating" are used interchangeably throughout this specification.

The terms "surface activation", "activating the surface", and the like of a substrate refer to all processes that promote the formation of chemical bond (e.g. covalent bond) between the substrate and the polyfunctional or bifunctional molecules of present invention.

As used herein, the term "polymer" refers to a macromolecule composed of repeating units. Herein, the term polymer includes copolymers as well as homopolymers. The term "copolymer" means a polymer derived from more than one species of monomer. The term "homopolymer" to a polymer resulting from polymerization of a single monomer.

As used herein, the term "polyfunctional molecule" encompasses molecules having one functional group that can react more than one time in succession as well as molecules with more than one reactive group. The polyfunctional molecule includes bifunctional molecule. The term "bifunctional molecule" refers to a molecule with two reactive groups. The bifunctional molecule may be homobifunctional or heterobifunctional. Homobifunctional molecules have at least two reactive functional groups, which are the same. Heterobifunctional molecules have at least two reactive functional groups, which are different. The terms "functional group" and "reactive group" retain their standard meaning in organic chemistry. The polyfunctional molecule and bifunctional molecule is able to react with a functional group on surface of a substrate such as a polymer and also is able to react with another molecule or metal such as known activators like palladium/Stannum colloid (Pd/Sn). The term "poly(bi)functional molecule" refers to a molecule that is polyfunctional or is specifically bifunctional.

As used herein, the term "substrate" includes any polymeric materials, thermoplastic, thermosetting or elastomeric materials. The substrate can be selected from the group consisting of acrylonitrile butadiene-styrene (ABS), blends of ABS with other polymers such as polycarbonate (PC/ABS), polystyrene (PS), polyamide, polyvinylchloride (PVC), polycarbonate, polyesters, polyacetal, polyolefins, thermosets as epoxy resins, unsaturated polyester resins, epoxy vinyl ester resins or elastomers such as Styrene-butadiene rubber (SBR), Styrenics, Styrene Acrylonitrile (SAN), Acrylic-Styrene-Acrylonitriles (ASA), ethylene propylene diene monomer (EPDM), and thermoplastic elastomers of the different types that exist in the market. The substrate can contain different types of inorganic fillers such as quartz, calcium carbonate, wollastonite, silicates, talcum and the corresponding additives necessary for extrusion processing, injection, hot plate molding, or the different techniques used to manufacture objects.

As used herein, the term "concentration" refers to a measure of an amount of a substance, such as a bifunctional molecule or acid component(s) as discussed herein, contained per unit volume of the aqueous composition or bath. For example, the weight/volume percentage concentration (w/v) refers to the mass or weight (e.g. in grams) of the bifunctional molecule or acid component(s) per volume (e.g. in mL) of the aqueous composition. The mass percent concentration (w/w) refers to mass of a substance such as a bifunctional molecule or acid components per mass of the aqueous composition.

Also herein, the recitations of numerical ranges and/or numerical values, including such recitations in the claims, can be read to include the term "about." The term "about" as used herein, refers to any value which lies within the range defined by a variation of up to ±10% of the value.

Moreover, for the purposes of the present disclosure, the term "a" or "an" entity refers to one or more of that entity unless otherwise limited. As such, the terms "a" or "an", "one or more" and "at least one" can be used interchangeably herein.

In one aspect of the present invention, an aqueous composition comprising a trivalent chromium salt and/or trivalent chromium complexes for use in etching a substrate surface is provided.

In one embodiment, Cr(III) is present or added to the aqueous composition as a salt and/or is present or added or formed in the aqueous composition as Cr(III) complex where it is chemically coordinated with at least one or more mono, bi, tri, tetra, penta, hexadentate ligands or bridge that are coordinated to the chromium by the of oxygen atom, sulfur or nitrogen or by several of these atoms.

In one embodiment, the ligands include, but not limited to, formate, acetate, propanoate, buatanoate, benzoate, phenylacetate, phenylpropionate, cyanamate, alkylbenzoates, pyruvate, levulinate, citrate, isocitrate, aconithate, trimellitate, glycinate, valinate, leucinate, threoninate, lysinate, tryptophanate, histidinate, phenylalaninate, isoleucinate, argininate, methioninate, alaninate, prolinate, serinate, cysteine, asparaginate, glutaminate, tyrosinate, aspartate, polyaspartate, glutamate, cysteine, homocysteinate, ornithinate, nicotinate, oxalate, propanedioate, butanedioate, pentanedioate, hexanedioate, maleate, fumarate, phthalate, isophthalate, terephthalate, tartrate, itaconate, mesaconate, citraconate, glycolate, lactate, mandelate, salicylate, gluconate, ethylenediaminetetraacetate, nitrilotriacetate, iminodisuccininate, ethylenediaminedisuccinate, methylglycineadiacetate, N,N, diacetateglutamate, cyclohexylenedinitrilotetraacetate, diethylenetriamainepentaacetate, aminoethylethylene glycoltetraacetate, triethylenetetraminehexaacetate, dihydroxyethylglycinate, iminodiacetate, oxamate, nitrilotripropionate, ethylenediamineadipropionate, thiodipropionate, dithiodipropionate, aminopropanoate, aminopentanoate, aminohexanoate, 2-aminobenzoate, 3-aminobenzoate, 4-aminobenzoate, 3-cyclohexylamino-propylamine, ethylenediamine, 1,3-diaminopropane, dimethylaminopropylamine, diethylaminopropylamine, bis (3-aminopropyl)-methylamine, diethylenetriamine, dipropylenetriamine, triethylenenetetramine, tetraethylenepentamine, polyamines, 3-(2-aminoethyl) amino-propylamine, N,N'-bis (3-aminopropyl) ethylenediamine, neopentanediamine, cyclohexanediamine, hexane-1,6-diamine, imidazole, 1-methylimidazole, 2-methylimidazole, 1,2-dimethylimidazole, 2-ethylimidazole, 2-ethyl-4-methyl-imidazole, N-(3-Aminopropyl)-imidazole, pyrazole, nystane, bipyridine, phenanthroline, formate, acetate, propionate, glycinate, argininate, aspartate, polyaspartate, glutamate, nicotinate, oxalate, propanedioate, butanedioate, pentanedioate, hexanedioate, maleate, fumarate, phthalate, salicylate, tartrate, citrate, glycolate, lactate, gluconate, ethylenediaminetetraacetate, nitrilotriacetate, 2-aminobenzoate, more preferably oxalate, propanedione, butanedione, maleate, fumarate, phthalate, glycolate, lactate, salicylate, glycinate, glutamate or mixtures thereof.

Optionally, the ligands for the Cr(III) complex include formate, acetate, propanoate, buatanoate, benzoate, phenylacetate, phenylpropionate, cyanamate, alkylbenzoates, pyruvate, levulinate, citrate, isocitrate, aconite, trimellitate, glycinate, valinate, leucinate, threoninate, lysinate, triptofanate, histidinate, phenylalaninate, isoleucinate, argininate, methioninate, alaninate, prolinate, serinate, cysteinate, asparaginate, glutaminate, tyrosinate, aspartate, polyaspartate, glutamate, cysteine, homocysteinate, ornithinato, nicotinate, oxalate, propanedioate, butanedioate, pentanedioate, hexanedioate, maleate, fumarate, phthalate, isophthalate, terephthalate, tartrate, itaconate, mesaconate, citraconate, glycolate, lactate, mandelate, salicylate, gluconate, ethylenediaminetetraacetate, nitrilotriacetate, iminodisuccininate, ethylenediaminedisuccinate, methylglycineadiacetate, N,N, diacetateglutamate, cyclohexylenedinitrilotetraacetate, diethylenetriamainepentaacetate, amino etiletilenglicoltetraacetato, trietilentetraminahexaacetato, dihidroxietilglicinato, iminodiacetate, oxamate, nitrilotripropionato, etilenodiaminadipropionato thiodipropionate, ditiodipropionato, aminopropanoate, aminopentanoate, aminohexanoate, 2-aminobenzoate, 3-aminobenzoate, 4-aminobenzoate, 3-cyclohexylamino-propylamine, ethylenediamine, 1,3-diaminopropane, dimethylaminopropylamine, diethylaminopropylamine, bis (3-aminopropyl)-methylamine, diethylenetriamine, dipropylenetriamine, triethylenenetetramine, tetraethylenepentamine, polyamines, 3-(2-aminoethyl) amino-propylamine, N,N'-bis (3-aminopropyl) ethylenediamine, neopentanediamine, cyclohexanediamine, hexane-1, 6-diamine, imidazole, 1-methylimidazole, 2-methylimidazole, 1,2-dimethylimidazole, 2-ethylimidazole, 2-ethyl-4-methyl-imidazole, N-(3-Aminopropyl)-imidazole, pyrazole, nicianamide, bipyridine, phenanthroline or their mixtures.

Optionally, the ligands are formate, acetate, propionate, glycinate, argininate, aspartate, polyaspartate, glutamate, nicotinate, oxalate, propanedioate, butanedioate, pentanedioate, hexanedioate, maleate, fumarate, phthalate, salicylate, tartrate, citrate, glycolate, lactate, gluconate, ethylenediaminetetraacetate, nitrilotriacetate, 2-aminobenzoate or their mixtures thereof.

Optionally, the ligands are oxalate, propanedione, butanedione, maleate, fumarate, phthalate, glycolate, lactate, salicylate, glycinate, glutamate or mixtures thereof.

The chromium (III) complexes contained or formed in the bath or supplied to the bath in the form of chromium (III) complex prepared by known methods and described, for example, in "Complex Ions of Chromium. III. Reactions between Hexaquochromium (III) and Oxalate Ions" Randall E. Hamm, Robert E. Davis J. Am. Chem. Soc., 1953, 75, pp 30853089 (1953), which is incorporated by reference herein in its entirety.

In one embodiment, the Cr (III) complexes are formed in situ in the bath by separately adding a salt of chromium (III) and the ligand that will form the required complex as described, for example, in U.S. Pat. No. 3,900,689, which is incorporated by reference herein in its entirety.

In the case of in situ formation of the Cr(III) complex, the starting salts of these complexes can be inorganic anion or organic anion salts such as: chloride, bromide, perchlorate, hydroxide, oxides, sulfate, sulfite, sulfide, nitrate, nitrite, phosphate, diphosphate, metaphosphate, polyphosphate, borate, silicate, formate, acetate, benzoate, lactate, methanesulfonate, ethanesulfonate, propanesulfonate, butanesulfonate, carboxylates, alkyl phosphates or their mixtures. The corresponding ligand(s) in its protonated form or in the form of an alkaline or alkaline earth metal salt or free form, necessary to form the complex are also added to the bath. In this way the chromium complex (III) required in the etching bath is obtained.

In another embodiment, Cr(III) complex is obtained by chemical reaction of the ligand or a reduced form of the ligand and a compound of Cr(VI), which reduces to Cr(III) complex either by direct action of the ligand or by the addition of a reducing agent other than the ligand as ascorbic acid, ascorbates, thiosulfates, sulphites, sulfides, nitrites, phosphites, hypophosphites, formaldehyde sulfoxylates, dithionites, oxalates, carboxylates of alkali or alkaline earth metals, hydrazine and its derivatives, hydroxylamine, or any other reducing agent known in the state of the art.

In one embodiment, the Cr(III) complex is a binuclear chrome complex surrounded by 4 oxalate molecules being the empiric formula $[Cr_2(C_2O_4)_4]^{2-}$ having the chemical structure 1:

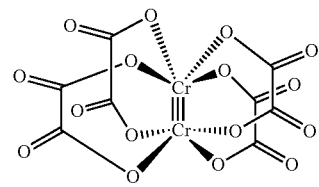

In one embodiment, the concentration of the Cr(III) complex, for example, $[Cr_2(C_2O_4)_4]^{2-}$, in the aqueous composition is between about 2 mM and about 2M and more preferably between about 5 mM and about 1M and even more preferably between about 0.01M and about 0.4M.

In another aspect of the present invention, an etched substrate is provided. The substrate's surface is etched via the aqueous composition comprising trivalent chromium salts and/or trivalent chromium complexes according to any of the preceding embodiments. The etched substrate can be stored for the purpose of subsequent metallization or coating or the etched substrate can be processed immediately to be metalized or coated.

In one embodiment, the etched substrate produced via contacting or immersing the surface of the substrate with an aqueous composition comprising trivalent chromium salt and/or trivalent chromium complexes. The contacting step and immersion step can be performed by known methods.

In one embodiment, the etched substrate produced via contacting or immersing the surface of the substrate with an aqueous composition comprising a Cr(III) complex catalyst, wherein the Cr(III) complex is a binuclear chrome complex surrounded by 4 oxalate molecules being the empiric formula $[Cr_2(C_2O_4)_4]^{2-}$ having chemical structure 1. The Cr(III) complex having the empiric formula $[Cr_2(C_2O_4)_4]^{2-}$ can be added to the aqueous composition or can be made in situ in the aqueous composition according to known methods.

In another embodiment, the present invention provides a system for use in etching, plating and/or coating of a substrate such as polymers. The system comprises an aqueous composition comprising a trivalent chromium salt and/or trivalent chromium complexes according to any of the preceding embodiments and one or more baths, distinct and separate from the aqueous composition. Optionally, the system comprises the aqueous composition comprising a Cr(III) complex catalyst having the empiric formula $[Cr_2(C_2O_4)_4]^{2-}$. The one or more baths of the system of present invention include a pre-activation bath, an activation bath, an accelerator bath, an electroless metal (e.g. Ni) bath, an immersion metal (e.g. Cu) bath, an electrolytic acid metal (e.g. Cu) bath, or any combinations thereof.

In another aspect of the present invention, an aqueous composition comprising a polyfunctional molecule for use in etching, plating, and/or coating a substrate surface is provided. Optionally, the polyfunctional molecule is a bifunctional molecule. One or more reactive group of a polyfunctional or bifunctional molecule reacts with a functional group on surface of a substrate such as polymer and the same or another reactive group reacts with another molecule, which is optionally is present in an aqueous composition such as metals, in particular known activators like palladium (Pd) or palladium/Stannum colloid (Pd/Sn).

The aqueous composition comprising a poly(bi)functional molecule activates the substrate (e.g. polymer) surface by chemical bonding of the poly(bi) functional molecule on the substrate surface. The poly(bi)functional molecule permits bonding or chelation of another molecule such as palladium from the activating bath, the activating bath can be a liquid stabilized colloid that contains Pd(0)/Sn(II).

In one embodiment, the bifunctional molecule is a silane coupling agent. The term "silane coupling agent" is intended to include a molecule having an alkoxy group (such as methoxy, ethoxy, propoxyl, isopropoxyl, butoxyl, and pentoxy group) capable of producing a silanol (Si—OH) group by hydrolysis at one end and having an organic functional group (such as thiol group, amino group, carboxylic group, alcohol group) at the other end.

The silane coupling agent comprises a functional group having the ability to associate with or chemicallly bond (e.g. covalently) to metal. Such functional groups are, for example, an amino group (such as —$NH_2$) and preferably a thiol group (such as —SH).

The metals that can associate with or chemically bond to a functional group of the silane coupling agent can be selected from the group consisting of palladium, copper, nickel, gold, platinum, silver, cobalt, ruthenium, rhodium, rhenium, manganese, chromium, molybdenum, tungsten, niobium, tantalum, titanium, zirconium, hafnium, zinc, cadmium, aluminum, gallium, indium, tin, and silicon, an alloy of two or more of the above metals, such as a palladium-copper alloy.

The aqueous composition comprising the poly(bi)functional molecule such as silane coupling agent to be applied to the substrate may be prepared by a method of simply dissolving an appropriate amount of the desired molecule (e.g. commercially available silane coupling agent) in a solvent such as water or an alcohol. The poly(bi)functional such as silane coupling agent may be applied by a method conventionally used by a person skilled in the art, examples of which include coating, spraying and immersion. Optionally, the substrate is immersed into the bath component of the poly(bi)functional molecule.

In one embodiment, the aqueous composition comprises a bifunctional molecule such as silane coupling agent having at least one functional group with metal trapping ability and at least another functional group with ability to chemically bond (e.g. covalently) to surface of a substrate (e.g. polymer, plastic). Optionally, the functional group with metal trapping ability is a thiol group. Optionally, the functional group with metal trapping ability is amino group. Optionally, the functional group with ability to chemically bond (e.g. covalently) to surface of a substrate such as polymers (e.g. plastic) is an alkoxy group, preferably, methoxy group.

In one embodiment, the silane coupling agent has the following empiric formula: $Si(R)_3$—$(CH_2)_n$—R', wherein R is a functional or reactive group which is hydrolysable group capable of forming a chemical bond or coupling with surface of a polymer such as plastic. Optionally, R is an alkoxy group, preferably methoxy (—O—$CH_3$) or ethoxy (—O—$CH_2CH_3$). R' is a functional or reactive group capable of forming a chemical bond or coupling with a metal. Optionally, R' is selected from a group consisting of thiol, amino, vinyl, epoxy, metharcyloxy, mercapto. Optionally, R' is a thiol (—SH) group. Optionally, R' is —NH group. n is an integer between 1 to 10. Optionally, n is between 1-5, optionally between 1-3, optionally, 2, optionally one(1).

In one embodiment, the silane coupling agent has the following empiric formula: $Si(OCH_3)_3$—$(CH_2)_n$—SH, wherein n is an integer between 1 to 10. Optionally, n is between 1-5, optionally between 1-3, optionally, 2, optionally one(1). Optionally, the silane coupling agent has the following chemical structure: $Si(OCH_3)_3$—$CH_2$—SH. Optionally, the silane coupling agent has the following chemical structure: $Si(OCH_3)_3$—$(CH_2)_3$—SH.

In another aspect of the present invention, an aqueous composition comprising a polyfunctional molecule or a bifunctional molecule according to any of the embodiments of present disclosure, an acid or mixture of acids and metallic salts or organometallic complexes for use in activating, plating, varnishing, or coating of a substrate surface is provided.

In one embodiment, the bifunctional molecule is a silane coupling agent having an alkoxy group (such as methoxy, ethoxy, propoxyl, isopropoxyl, butoxyl, and pentoxy group) capable of producing a silanol (Si—OH) group by hydrolysis at one end, which have the ability to form a chemical bond (e.g. covalently) to the surface of a polymer (e.g. plastic); and having an organic functional group (such as thiol group or amino group) at the other end having the ability to associate with or bond to metal.

In one embodiment, the metallic salt is Cr(III) salt and/or $KMnO_4$. Optionally, the aqueous composition comprises Oxalic acid. Optionally, the concentration of Cr (III) salt in the aqueous composition is between about 1000-1200 ppm, optionally, about 1100 ppm. Optionally, the concentration of Oxalic acid in the aqueous composition is between about 30-160 mg/l, optionally, between about 100-160 mg/l, optionally, between about 150-160 mg/l, optionally is about 150 mg/l.

In one embodiment, the organometallic complex is Cr(III) complex according to any of the preceding embodiments.

Optionally, the Cr(III) complex is according to the empiric formula: $[Cr_2(Ox)_4]^{2-}$, Ox being Oxalate.

In one embodiment, the acid or mixture of acids comprises acids comprises sulfuric acid and/or phosphoric acid.

In one embodiment, the aqueous composition comprises a bifunctional molecule, an acid or mixture of acids and metallic salts and/or organometallic complexes for use in activating, plating, varnishing, or coating of a substrate surfaces, wherein, the bifunctional molecule has the following empiric formula $Si(R)_3$—$(CH_2)_n$—R' according to any of the embodiments of present disclosure, wherein R is a functional or reactive group which is hydrolysable group, optionally, R is an alkoxy group, preferably methoxy (—O—$CH_3$) or ethoxy (—O—$CH_2CH_3$). R' is a functional or reactive group capable of forming a chemical bond or coupling with a metal, optionally, R' is selected from a group consisting of thiol, amino, vinyl, epoxy, metharcyloxy, mercapto. Optionally, R' is a thiol (—SH) group. Optionally, R' is —NH group. n is an integer between 1 to 10. Optionally, n is between 1-5, optionally between 1-3, optionally, 3, 2, optionally one(1); wherein the organometallic complex is Cr(III) complex according to any of the embodiments of present disclosure; wherein the acids are selected from a group consisting of any or combination of any acids of any of the embodiments of present invention.

In one embodiment, the aqueous composition comprises a bifunctional molecule having empiric formula $Si(OCH_3)_3$—$(CH_2)_n$—SH, wherein n is an integer between 1 to 10, optionally, n is 3; a Cr(III) complex having empiric formula $[Cr_2(Ox)_4]^{2-}$, Ox being Oxalate and mixture of acids such as mixture of phosphoric acid and sulfuric acid.

In one embodiment, the aqueous composition comprises phosphoric acid, sulfuric acid, Cr(III) salts, Oxalic acid, and a bifunctional molecule having the empiric formula $Si(OCH_3)_3$—$(CH_2)_n$—SH, wherein n is an integer between 1 to 10, optionally, n is 3.

In one embodiment, the substrate surface (e.g. polymer surface) is oxidized creating an active site to be chemically bonded (e.g. covalently) with a poly(bi)functional molecule having the ability to associate or bond to a metal such as Pd or other electroless catalyst that promote the electroless deposition of metals. Optionally, the poly(bi)bifunctional molecule can chemically bond to an unetched surface of a polymer, i.e. the surface of the polymer has not been etched prior to addition of the poly(bi)functional molecule according to any of the preceding embodiments. Optionally, the poly(bi)bifunctional molecule can chemically bond to an etched surface of a polymer.

Figure 1B:
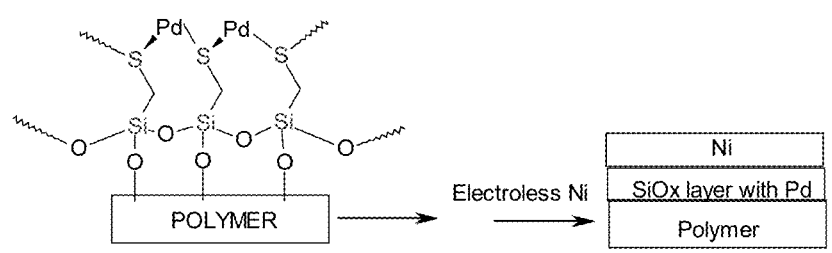

In one embodiment, for instance, the surface of a polymer is oxidized via Cr(III) complex catalyst according to any of the preceding embodiments, for example, with a Cr(III) complex having the empiric formula of $[Cr_2(C_2O_4)_4]^{2-}$ and chemically reacted or bonded with the silane coupling agent according to any of the embodiments of present disclosure, for example, having the empiric formula $Si(OCH_3)_3$—$(CH_2)_3$—SH to form a silane layer on the surface of the polymer as shown in FIG. 1A. Optionally, a metal such Pd is chemically bonded or anchored on the silane surface, optionally, for subsequent metal (e.g. Ni) plating. Example of this reaction is shown in FIG. 1B.

In one embodiment, the concentration of the poly(bi)functional molecules according to any of the embodiments of present disclosure in the aqueous composition is between about 0.17-0.21 g/l, optionally, about 0.17, 0.18, 0.19, 0.20, 0.21 g/l. Optionally, the concentration is about 0.5-4 wt. %, optionally, about 2 wt. %, optionally less than about 1 wt. %.

In another embodiment, the present invention provides a metallization or coating system, wherein the system comprises one or more distinct and separate aqueous compositions or baths.

In one embodiment, the system comprises an aqueous composition or a bath comprising a poly(bi)functional molecule and additional separate and distinct baths, which include, but not limited to, any or any combination of the following baths: a pre-activation bath, an activation bath, an accelerator bath, an electroless Ni bath, an immersion Cu bath, or an electrolytic acid Cu bath.

In one embodiment, a process for metalizing a substrate is provided, where the substrate such as ABS or PC/ABS is contacted or immersed in an aqueous composition or a bath comprising a poly(bi)functional molecule such as a bifunctional molecule having the following chemical formula: $Si(OCH_3)_3$—$(CH_2)_n$—SH, wherein n is an integer between 1 to 10, optionally, n is 3.

In one embodiment, the substrate such as ABS or PC/ABS is etched via contacting or immersing the substrate in an aqueous composition or a bath comprising: a bifunctional molecule having the following chemical formula: $Si(OCH_3)_3$—$(CH_2)_n$—SH, wherein n is an integer between 1 to 10, optionally n is 3; and a Cr(III) catalyst such as a bi-nuclear chrome complex surrounded by 4 oxalate molecules being the empiric formula $[Cr_2(C_2O_4)_4]^{2-}$. Optionally, the bath contains phosphoric acid and/or sulfuric acid.

The temperature of the bath comprising poly(bi)functional molecule or poly(bi)functional molecule and Cr(III) complex catalyst according to the embodiments of present disclosure can be between about 10-95° C., optionally between 15-85° C., optionally between about 20-75° C., optionally between about 50-80° C., optionally between 60-70° C., optionally the temperature is 65° C., optionally 70° C. Optionally the temperature of the bath where ABS to be immersed or contacted is 65° C. and optionally the temperature of the bath where PC/ABS to be immersed or contacted is 70° C. Optionally, the substrate is immersed in or contacted with the bath for about 5-20 min, optionally, for 10 min.

After the substrate is activated by aqueous composition comprising poly(bi)functional molecule according to any of the embodiments of present disclosure and/or Cr(III) salt or complex according to any of the embodiments, the process of metallization is carried out by consecutive immersion of the substrate in various conventional solutions or baths such as a pre-activation bath, an activation bath, an accelerator bath, an electroless Ni bath, an immersion Cu bath, or an electrolytic acid Cu bath. The substrate can be rinsed after being treated with each bath or before being immersed in another bath. The rinsing can be performed, for example, via water or distilled water having temperature in a range of from about 20° C. to about 75° C., more preferably below 50° C., for a period of time preferably in a range of from about 10 seconds to about 60 seconds, more preferably about 30 seconds.

Before metallizing the substrate, it may be desirable, although not necessary, to subject the substrate to pre-activation bath and/or activation bath. Pre-activation of substrates is well known in the art and any number of known solutions may be used. Pre-activation may be accomplished by treating the substrate with an aqueous solution containing hydrochloric acid, optionally, HCL reagent grade diluted. Optionally, substrate is immersed in or contacted with a preactivation bath for about 10 seconds to 2 min, optionally, 15 seconds to 1 min, optionally for 30 seconds. The temperature of the preactivation bath can be a room temperature, i.e. about 20-25° C.

Activation may be accomplished by treating the substrate with aqueous solutions of metal ions (e.g. palladium, platinum, gold, silver, rhodium, osmium or iridium). Optionally, the activation bath contains Pd/Sn colloid. The substrate is immersed or contacted with an activator bath having a temperature of 20-50° C., optionally 30-40° C., optionally about 35° C. for about 2-8 min, optionally 3-7, optionally, 4-5 min, optionally 4 min.

The treated substrate is optionally rinsed again and immersed in or contacted with an accelerator bath having a temperature of 30-60° C., optionally 40-50° C., optionally, 45-48° C. for about 1-5 min, optionally 2-4 min, optionally 2-3 min, optionally 2.5 min. Optionally, the accelerator bath contains a commercially available chemical, Macuplex Ultracell 9369.

Electroless deposition is a generally known technique involving contacting the treated substrate in an aqueous solution of metal ions that forms a metallic layer by electroless reduction of ionic metals in solution to zero oxidation state becoming a solid continuous metallic layer, for example copper, nickel, gold, silver and metal alloys. Such solutions are capable of auto catalytically depositing the metal on the surface of the substrate without the use of electricity. Optionally, after being subjected to the accelerator bath and following a third round of rinsing, the (etched) substrate is then immersed in or contact with a commercially available electroless nickel or electroless-Ni bath (e.g. Adhemax LFS) having a temperature of 20-50° C., optionally 30-40° C., optionally 30-35° C., optionally 32° C. for about 5-15 min, optionally 7-10 min, optionally 9 min. Fourth round of rinsing can be performed thereafter.

Then, optionally the treated substrate is immersed in or contacted with a commercially available immersion copper bath (e.g. Adhemax) having ambient temperature, preferably room temperature, optionally 20-25° C. Optionally, the substrate is further immersed or contacted with a commercially available electrolytic copper or electrolytic-Cu bath (e.g. Cupracid 210) having a temperature of 20-40° C., optionally 25-30° C., optionally 27° C. for about 40-80 min, optionally, 60-70 min. The current in this bath can be, for example, 4 A/dm2. Optionally, the substrate is not immersed in the immersion copper bath.

In one embodiment, the aqueous composition comprising poly(bi)functional molecule and/or a trivalent chromium salt and/or trivalent chromium complexes according to any of the embodiments of present disclosure contains acid(s). The term "acid" as used herein, refers to a substance that tends to release a proton. The acid(s) of present invention include, but not limited to, sulfuric acid, aminosulfuric acid (sulfamic acid), phosphoric acid, diphosphoric acid, metaphosphoric acid, polyphosphoric acid, methanesulfonic acid, ethanesulfonic acid, propanesulfonic acid, benzenesulfonic acid, acid toluenesulfonic acid, cumene sulphonic acid, alkylbenzenesulphonic acids, monoalkylphophoric acids, dialkylphosphoric acids, isethionic acid, perchloric acid, chloric acid, nitric acid, trifluoromethanesulfonic acid, trifluoroacetic acid, tetrafluoroboric acid, hexafluorophosphoric acid, hexafluorosilicic acid, fluorhydric acid, boric acid or their mixtures.

In one embodiment, the acids include sulfuric acid, aminosulfuric acid (sulfamic acid), phosphoric acid, diphosphoric acid, metaphosphoric acid, polyphosphoric acid, methanesulfonic acid, acid ethanesulfonic acid, propanesulfonic acid, butanesulphonic acid, alkanesulphonic acids, benzenesulphonic acid, toluenesulphonic acid, cumene sulphonic acid, alkylbenzenesulphonic acids, monoalkylphophoric acids, dialkylphosphoric acids, isethionic acid, perchloric acid, acid chloric acid, nitric acid, trifluoromethanesulfonic acid, trifluoroacetic acid, tetrafluoroboric acid, hexafluorophosphoric acid, hexafluorosilicic acid, fluorhydric acid, boric acid or mixtures thereof. Thereby, forming an acidic aqueous composition.

Optionally, the acids include sulfuric acid, phosphoric acid, diphosphoric acid, metaphosphoric acid, polyphosphoric acids, methanesulfonic acid, ethanesulfonic acid, propanesulfonic acid, benzenesulfonic acid, toluenesulfonic acid, cumenesulfonic acid, alkylbenzenesulfonic acids, monoalkylphosphoric acids, dialkylphosphoric acids or their mixtures. Optionally, the acid is sulfuric acid, phosphoric acid or their mixtures.

In one embodiment, the mass percent concentration (w/w) of the acid(s) in the aqueous composition is between about 10%-98%, optionally between about 40%-95% and optionally between about 55%-92%. This totality of acid can be formed by the mixture of two or more acids.

In one embodiment, the substrate according to any of the embodiments of present disclosure is ABS, PC/ABS, PA, SAN or other styrenics.

In one embodiment, the aqueous compositions according to any of the embodiments are used for etching, activating, metallization, painting, varnishing and/or coating of the substrate such as polymeric materials.

In another aspect of the present invention, a process of etching, activating, plating, and/or coating of a substrate surface containing polymers using the aqueous compositions according to any of the preceding embodiments is provided.

In one embodiment, the surface of the substrate to be etched and/or activated is optionally cleaned by existing methods to remove contaminants, greases, corrosive products and other materials. To achieve working temperatures, the treatment tanks are heated or cooled to maintain the optimum working temperature by applying any appropriate technology for this purpose.

The substrate of any shape and size are immersed in the aqueous composition of the present invention for a period of time between 30 seconds and an hour or preferably between 1 minute and 45 minutes or more preferably between 2 minutes and 30 minutes. Thereby, the surface of the substrate is activated.

Examples 1-18

General Conditions

The substrates used in the examples 1-18 are substrates obtained by injection of the corresponding thermoplastic polymer: ABS, ABS-polycarbonate, polyamide 6, polyamide 6 with 20% wollastonite inorganic filler, polypropylene or polypropylene with 20% talc inorganic filler.

In the case of thermostable type substrates, the curing thereof is carried out by methods known in the state of the art and the thermostable type substrates can be unsaturated polyester resin with 40% glass fiber and epoxy resin with 40% glass fiber.

In all cases, the substrate is washed prior to its etching. The washing is carried out by immersion in a water bath, an aqueous solution bath of 1% sodium dodecyl sulfate and two subsequent rinses by immersion in two water baths. The prewashing is intended to remove dirt and grease from the substrates and/or prepare the surface for etching. Depending on the process of preparation of the substrate, this washing can be avoided. The etching treatment is carried out with the corresponding baths that are presented in the following examples.

After the etching process, two successive rinsing are carried out by immersion in water baths.

Once the polymer is etched, the deposition of autocatalytic chemical nickel, also known as nickel chemistry, is carried out by a process known in the state of the art. For example, the process involves the following steps: treating the substrate by immersion in an activator bath at 25° C. for 2 minutes, rinsing the substrate in water bath, treating the substrate in an accelerator bath at 25° C. for 2 minutes, rinsing the substrate in water bath, and immersing the substrate in an immersion bath for chemical nickel plating at 29° C. for 8-25 min.

In a similar way, once the etching is done and the substrates are dried, the coating of the polymer can be carried out by means of an organic-based coating or paint.

Example 1

A conventional etching bath containing Cr(VI) salts with the following composition were prepared:

The etching bath contained 380 gr/L of chromic acid and 400 g/L of concentrated sulfuric acid. The substrate to be etched are introduced into the bath for 3 minutes at a temperature of 25° C.

Example 2

An aqueous composition based on a Cr(III) complex, wherein the ligand which coordinates to chromium is acetate was prepared. The aqueous composition comprised 62% $H_2O$ solution; 4% chromium (III) acetate; 34% $H_2SO_4$.

The substrate to be etched are introduced into the bath for 3 minutes at a temperature of 25° C.

Example 3

An aqueous composition based on a Cr(III) complex, wherein the ligand which coordinates to chromium is benzoate was prepared. The aqueous composition comprised 40% $H_2O$; 3% chromium (III) benzoate; and 57% methanesulfonic acid.

The substrate to be etched are introduced into the bath for 3 minutes at a temperature of 25° C.

Example 4

An aqueous composition based on a Cr(III) complex, wherein the ligand which coordinates to chromium is glycinate was prepared. The aqueous composition comprised 21% $H_2O$; 2.5% chromium glycinate (III); 65.5% $H_2SO_4$.

The substrate to be etched are introduced into the bath for 3 minutes at a temperature of 25° C.

Example 5

An aqueous composition based on a Cr(III) complex, wherein the ligand which coordinates to chromium is aminohexanoate was prepared. The aqueous composition comprised 21% $H_2O$; 2.2% $CrCl_3 \cdot 6H_2O$; 1.3% aminohexanoic acid; 36.5% $H_3PO_4$ (75% in water); 39% $H_2SO_4$.

The substrate to be etched are introduced into the bath for 3 minutes at a temperature of 25° C.

Example 6

An aqueous composition based on a Cr(III) complex, wherein the ligand which coordinates to chromium is citrate was prepared. The aqueous composition comprised 17% $H_2O$; 1.2% $Cr(NO_3)_3 \cdot 9H_2O$; 2.6% citric acid; 39.7% $H_3PO_4$ (75% in water); 39.5% $H_2SO_4$.

The substrate to be etched are introduced into the bath for 3 minutes at a temperature of 25° C.

Example 7

An aqueous composition based on a Cr(III) complex, wherein the ligand which coordinates to chromium is triethylene tetraamine was prepared. The aqueous composition comprised 19% H2O; 0.8% $Cr(NO3)_3 \cdot 9H_2O$; 1.1% triethylenetetraamine; 38.4% $H_3PO_4$ (75% in water); 40.7% $H_2SO_4$.

The substrate to be etched are introduced into the bath for 3 minutes at a temperature of 25° C.

Example 8

An aqueous composition based on a Cr(III) complex, wherein the ligand which coordinates to chromium is thiodipropionate was prepared. The aqueous composition comprised 18.5% $H_2O$; 0.7% $CrCl_3 \cdot 6H_2O$; 0.9% thiodipropionic acid; 38% $H_3PO_4$ (75% in water); 41.9% $H_2SO_4$.

The substrate to be etched are introduced into the bath for 3 minutes at a temperature of 25° C.

Example 9

An aqueous composition based on a Cr(III) complex, wherein the ligand which coordinates to chromium is ethylenediamine teraacetate (EDTA) was prepared. The aqueous composition comprised 18% $H_2O$; 0.6% $Cr(NO3)_3 \cdot 9H_2O$; 0.3% ethylenediaminetetraacetic acid; 39.7% $H_3PO_4$ (75% in water); 41.4% $H_2SO_4$. The substrate to be etched are introduced into the bath for 3 minutes at a temperature of 25° C.

Example 10

An aqueous composition based on a Cr(III) complex, wherein the ligand which coordinates to chromium is ethylenediamine teraacetate (EDTA) was prepared. The aqueous composition comprised 18.3% H2O; 0.6% Cr (NO3) 3.9H2O; 0.5% acid disodium salt ethylenediaminetetraacetic; 39.2% $H_3PO_4$ (75% in water); 41.4% $H_2SO_4$.

The substrate to be etched are introduced into the bath for 3 minutes at a temperature of 25° C.

Example 11

An aqueous composition based on a Cr(III) complex, wherein the ligand which coordinates to chromium is ethylenediaminetetraacetate (EDTA) was prepared. The aqueous composition comprised 18% $H_2O$; 0.6% $Cr(NO_3)_3 \cdot 9H_2O$; 0.3% ethylenediaminetetraacetic acid; 39.7% $H_3PO_4$ (75% in water); 41.4% $H_2SO_4$. The substrate to be etched are introduced into the bath for 3 minutes at a temperature of 40° C.

Example 12

An aqueous composition based on a Cr(III) complex, wherein the ligand which coordinates to chromium is ethylenediamine teraacetate (EDTA) was prepared. The aqueous composition comprised 18% $H_2O$; 2% $Cr(NO_3)_3 \cdot 9H_2O$;

1% ethylenediaminetetraacetic acid; 35.5% methanesulfonic acid (75% in water); 43.5% $H_2SO_4$.

The substrate to be etched are introduced into the bath for 3 minutes at a temperature of 25° C.

Example 13

An aqueous composition based on a Cr(III) complex, wherein the ligand which coordinates to chromium is fumarate was prepared. The aqueous composition comprised 18% $H_2O$; 0.6% $Cr(NO_3)_3 \cdot 9H_2O$; 0.3% fumaric acid; 39.7% $H_3PO_4$ (75% in water); 41.4% $H_2SO_4$.

The substrate to be etched are introduced into the bath for 3 minutes at a temperature of 25° C.

Example 14

An aqueous composition based on a Cr(III) complex, wherein the ligand which coordinates to chromium is oxalate was prepared. The aqueous composition comprised 18% H2O; 0.9% $Cr(NO_3)_3 \cdot 9H2O$; 0.6% oxalic acid $H_2C_2O_4 \cdot 2H_2O$; 39.7% $H_3PO_4$; 40.8% $H_2SO_4$.

The substrate to be etched are introduced into the bath for 3 minutes at a temperature of 25° C.

Example 15

An aqueous composition based on a Cr(III) complex, wherein the ligand which coordinates to chromium is oxalate was prepared. The aqueous composition comprised 17.7% H2O; 1.2% $Cr(NO_3)_3 \cdot 9H_2O$; 0.6% oxalic acid $H_2C_2O_4 \cdot 2H_2O$; 39.7% $H_3PO_4$ (75% in water); 40.8% $H_2SO_4$.

The substrate to be etched are introduced into the bath for 3 minutes at a temperature of 25° C.

Example 16

An aqueous composition based on a Cr(III) complex, wherein the ligand which coordinates to chromium is salicylate was prepared. The aqueous composition comprised 18% H2O; 0.6% $Cr_2O_3$; 0.8% salicylic acid; 39.7% $H_3PO_4$ (75% in water); 40.9% $H_2SO_4$.

The substrate to be etched are introduced into the bath for 3 minutes at a temperature of 25° C.

Example 17

An aqueous composition based on a Cr(III) complex, wherein the ligand which coordinates to chromium is salicylate was prepared. The aqueous composition comprised 18% $H_2O$; 0.6% $Cr_2O_3$; 0.8% salicylic acid; 39.7% $H_3PO_4$ (75% in water); 40.9% $H_2SO_4$.

The substrate to be etched are introduced into the bath for 3 minutes at a temperature of 60° C.

Example 18

An aqueous composition based on a Cr(III) complex, wherein the ligand which coordinates to chromium is gluconate was prepared. The aqueous composition comprised 18% H2O; 0.6% $Cr_2(SO_4)_3$—$H_2O$; 2% sodium gluconate; 38% $H_3PO_4$ (75% in water); 41.4% $H_2SO_4$.

The substrate to be etched are introduced into the bath for 3 minutes at a temperature of 60° C.

Results

The metallized substrates are subjected to the Adhesion test by the lattice-cutting test (ISO 2409), which is one of the methods commonly used to determine the adhesion of coatings on polymers. The result of adhesion is valued from 0 to 5, 0 being an excellent adhesion and the peeling method following DIN 53494.

The adhesion results of the metallic layer obtained after the etching and metallization of the pieces are shown in the following Table 1:

| Bath example | Polymer | ISO 2409 | Force Media per N/cm |
|---|---|---|---|
| Bath example 1 | ABS | 0 | 8.5 |
| Bath example 1 | ABS-polycarbonate | 0 | 4.3 |
| Bath example 1 | Polyamide 6 | 1 | 2.2 |
| Bath example 1 | Polyamide 6 with 20% wollastonita | 0 | 3.2 |
| Bath example 1 | Polypropylene | 4 | 0.4 |
| Bath example 1 | Polypropylene load 20% talc | 4 | 0.6 |
| Bath example 1 | Unsaturated fiberglass polyester | 1 | 0.6 |
| Bath example 1 | Epoxy glass fiber | 0 | 3.1 |
| Bath example 2 | ABS | 0 | 7.4 |
| Bath example 2 | ABS-polycarbonate | 0 | 3.8 |
| Bath example 3 | ABS | 0 | 8.1 |
| Bath example 3 | ABS-polycarbonate | 0 | 4.2 |
| Bath example 4 | ABS | 0 | 7.9 |
| Bath example 4 | ABS-polycarbonate | 0 | 4.4 |
| Bath example 4 | Polyamide 6 | 2 | 1.6 |
| Bath example 4 | Polyamide 6 with 20% wollastonita | 1 | 2.5 |
| Bath example 5 | Unsaturated fiberglass polyester | 2 | 1.3 |
| Bath example 5 | Epoxy glass fiber | 0 | 4.7 |
| Bath example 6 | ABS | 0 | 7.3 |
| Bath example 7 | ABS | 0 | 6.9 |
| Bath example 8 | ABS | 0 | 6.6 |
| Bath example 9 | Polypropylene 20% talco | 3 | 0.9 |
| Bath example 10 | Polypropylene 20% talco | 3 | 0.8 |
| Example 11 | Polypropylene 20% talco | 4 | 0.6 |
| Example 12 | Polypropylene 20% talco | 4 | 0.5 |
| Example 13 | ABS | 0 | 8.2 |
| Example 14 | ABS | 0 | 8.0 |
| Example 14 | ABS-Polycarbonate | 0 | 4.9 |
| Example 14 | Polyamide 6 with 20% wollastonita | 0 | 3.7 |
| Example 14 | Polypropylene load 20% talco | 3 | 1.0 |
| Example 15 | ABS | 0 | 7.9 |
| Example 16 | ABS | 0 | 7.5 |
| Example 17 | ABS | 0 | 7.5 |
| Example 18 | ABS | 0 | 7.7 |

The substrates coated with paint or organic coating were prepared after treatment of the bath by drying in air stream at 40° C. for 2 hours and subsequent coating by airbrush. The paint used is standard type called 5 100% solids based on triethylene glycol diacrylate and UV curing applied according to manufacturer's recommendations.

The adhesion results of the paint submitted to the ISO2409 test is shown in Table 2:

| Bath example | Polymer | ISO 2409 |
|---|---|---|
| Bath example 1 | Polypropylene 20% talco | 3 |
| Bath example 2 | Polypropylene 20% talco | 3 |
| Bath example 3 | Polypropylene 20% talco | 3 |

-continued

| Bath example | Polymer | ISO 2409 |
|---|---|---|
| Bath example 10 | Polypropylene 20% talco | 3 |
| Bath example 11 | Polypropylene 20% talco | 3 |

Example 19

An activating bath according to the present disclosure was tested on an ABS and PC/ABS substrate. The bath contained about 43 wt % $H_2SO_4$, about 41 wt % $H_3PO_4$, about 4 wt % Cr(III) catalyst: $[Cr^2(Ox)^4]^{-2}$, Ox being oxalate and about 2 wt % a bifunctional molecule: $Si(OCH_3)_3$—$(CH_2)_3$—SH. $H_2SO4$ and $H_3PO4$ create oxidation points on the surface of ABS. The bifunctional molecule bonds with the surface of the ABS substrate and with to be deposited in the bath, palladium (Pd). Thus, the bifunctional molecule acts as a bridge between the ABS substrate and metal such as Pd and acts as support for Pd deposition and subsequent electroless nickel deposition.

Example 20

The process comprised baths as shown in Table 3. As shown in Table 3, the MSA bath refers the activating bath according to example 20. Rinsing baths were prepared with distilled water. There was no rinsing between pre-activator bath and (Pd/Sn) activator bath. The immersion Cu bath is optional and might not be used. All baths were monitored in temperature and treatment time is measured with digital timers for each bath. The following substrates were used: PC/ABS: Infino WP1041G NP from Lotte advanced materials and ABS: Starex MP0160 R grey from Lotte advanced materials Process conditions were the following, Table 3:

| | Baths | Temperature (° C.) | Time (min) | Stirring |
|---|---|---|---|---|
| Chemical line | MSA | 65 (ABS); 70 (PC/ABS) | 10 | mechanical |
| | Preactivator | Room Temperature | 30 seconds | air |
| | Activator | 35 | 4 | mechanical |
| | Accelerator | 48 | 4 | Air |
| | Electroless-Ni | 32 | 9 | mechanical |
| | Immersion Cu | Ambient | 1 | mechanical |

The electrolytic tank for Cu deposition was stirred with air and heated with a immersion resistance. Processing conditions were the following, Table 4:

| Temperature (° C.) | Time (min) |
|---|---|
| 27 | 60 |

| Voltage (V) | Current (A/dm$^2$) |
|---|---|
| Approx. 1.5 | 3.5 |

To improve the conductivity of Ni layer samples were treated with an immersion Cu solution.

The commercially available chemicals used in the baths were the following, Table 5:

| Pre-Activation | Activator | Accelerator | Electroless Ni | Inmersion Cu | Electrolitic Cu |
|---|---|---|---|---|---|
| 21% HCl (37% v/v) | Macuplex ® D34M | MACUPLEX ® ULTRACEL 9369 ® | Adhemax ® LFS1 Adhemax ® Cu A LFS2 Adhemax ® LFS3 | Adhemax ® inmersion Adhemax ® inmersion Cu B | CuSO$_4$ H$_2$SO$_4$ Cupracid ® 210 Cupracid ® 210 parte A Cupracid ® 210 parte B |

The treated substrates were successfully Cu plated and a peeling test was performed, and Cu and Ni thickness was measured. The Peeling-off test was performed using the method described in ASTM B533. Ni thickness was measured by solution in $HNO_3$ and volumetric determination and Cu thickness was measured by columbimetric methods. The following results for ABS were obtained, Table 6:

| Bath | Peel test (N/cm) | Cu Thickness (μm) | Ni thickness (μm) |
|---|---|---|---|
| Example 20 | ABS 13 N/cm | 39 (45 min at Cu bath) | ≈0.18-0.20 |
| | PC/ABS 9 N/cm | 32.9 (45 min at Cu bath) | ≈0.18-0.20 |

Example 21

The polymer samples selected in this example were PC/ABS and ABS. The aqueous composition comprising phosphoric acid, sulfuric acid, $[Cr_2(Ox)_4]^{2-}$, OX is oxylate, and a bifunctional molecule (BFM) having empiric formula $Si(OCH_3)_3$—$(CH_2)_3$—SH was prepared. The concentration of the components in the baths are listed below, Table 7:

| Bath formulation comprising | |
|---|---|
| Chemicals | Content % (w/w) |
| H$_2$SO$_4$ | 43 |
| H$_3$PO$_4$ | 41 |
| BFM | <1 |
| Cr(III)complex: $[Cr_2(Ox)_4]^{2-}$ OX is oxylate | 4 |

Different plating baths was prepared having the following components:
Preactivator bath: HCl reagent grade diluted
Activator bath: Macuplex® D34C/Adhemax® Activator.
Acelerator bath: Macuplex Ultracell® 9369
Nickel electroless: Adhemax LFS®
Immersion copper: Adhemax®
Electrolytic copper: Cupracid 210®

Every sample was unpacked and cleaned with water and standard lab. Samples were immersed in the following consecutive baths: bath formulation above, pre-activator, Pd/Sn activator, accelerator, electroless Ni, Immersion Cu, and Electrolytic acid Cu. A rinsing step was performed between each bath.

These baths were conditioned previously to ensure constancy in the temperature. Time and temperature for each specific bath was stablished according the average activity level of these chemicals. The limiting step in terms of time is the electrolytic deposition of Copper, therefore, process permits to run an additional rack meanwhile the first rack is being Cu metallized. The current (Amp) was adapted proportionally depending the number of racks in the Cu bath to maintain constant the A/$dm^2$ Peeling results obtained according to the conventional Cr(VI) etched substrate according to example 1 and MSA bath of present invention was compared. The following values were obtained using the settled conditions, Table 8:

| Etching | Peel adhesion (N/cm) | Cu thickness (μm) |
|---|---|---|
| Conventional Cr(VI), example 1 | 13.39 | 77 |
| Bath formulation of example 21 | ABS 13 N/cm PC/ABS 9 N/cm | 39 32.9 |

Figure 2A:
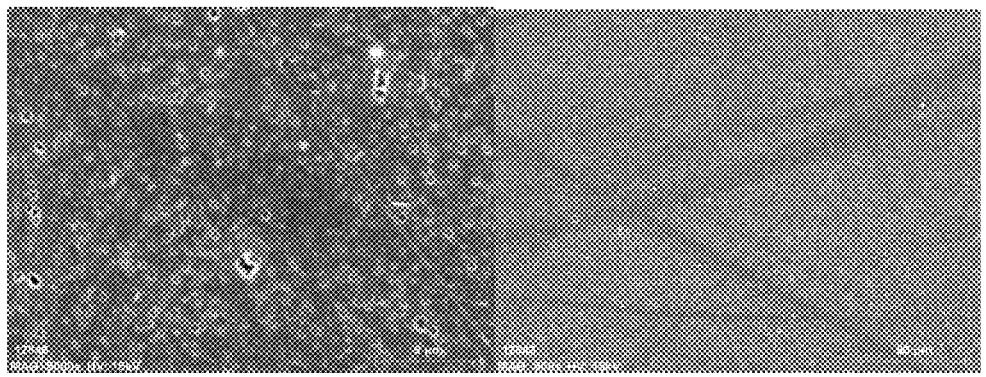
FIG. 2A shows ABS surface morphology observed by Scanning Electron Microscopy (SEM) after treatment with the MSA bath of present disclosure
Figure 2B:
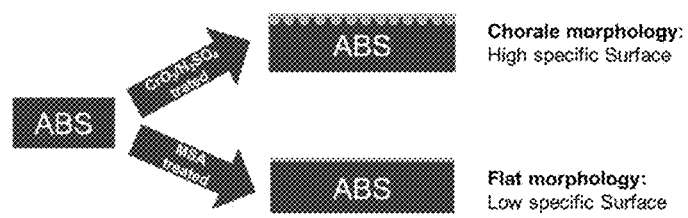
FIG. 2B shows ABS surface morphology observed by Scanning Electron Microscopy (SEM) after treatment with the conventional etching bath of present disclosure.

Further, surface morphology of the samples were analyzed. Ni thickness was measured(by titration method) based on the measurement of weight of deposited Ni and converted into Ni thickness by calculations with the known density of Ni deposit. This measurement method by mass determination applied to conventional etched surfaces (with $CrO_3/H_2SO_4$) according to example 1. The MSA morphology (observed by Scanning Electron Microscopy (SEM)) as shown in FIG. 2A is significantly flatten than chrome etched surfaces, providing in this way a lower specific surface than obtained by conventional etch. MSA process create small cavities (smaller than conventional etch) and surface is considerably flattened than etched with $CrO_3/H_2SO_4$ mixture. As shown in FIG. 2B, nickel deposits are filled in the cavity trapping the mechanical bonding of nickel in the holes. In addition, these cavities has required large amount of nickels on the surface to have the ABS plated.

Further, other atomic technique Inductively Coupled Plasma Spectrometry (ICP) was selected to measure the Pd atoms and evidence the attachment of the BFM by measuring the Si and S on the polymer surface. The results obtained for the plated were, Table 9:

| Element | Quantity mg/plaque | ppm (*) |
|---|---|---|
| Ni | 12.5 | 371 |
| Sn | 0.012 | 0.34 |
| Si | 0.027 | 3.06 |
| Pd | 0.057 | 1.69 |
| S | 0.103 | 3.06 |

(*) Considering that an ABS plaque weights 0.0337 Kg

The measurement of the MSA performance was understood as the polymer surface treated by a volume of MSA bath with no refreshment or addition of chemicals. The output variable for experiments is the adhesion measured by peeling-off test (ASTM B533) and acceptance criteria was taken from the GMW 14668 specification (Acceptable values values are 9N/cm for ABS and 4.5 N/cm for PC/ABS).

The MSA bath provided good peel adhesion with no refreshment almost in 10 to 15 days and almost 140 $dm^2$ plated. It was establishing an operative range of the MSA bath is about 30 $dm^2$/L without refreshment with adhesion guarantees.

Example 22

In this example, stability of the MSA bath according to example 21 was tested. Durability of the bath in ambient conditions has implications on the logistics and storage of this chemistry in a potential industrial process using these chemicals. Therefore, the stability of the bath with all the components were analyzed under controlled conditions to define a maximum time recommended for storage.

The MSA bath according to example 21 was prepared and average peel adhesion was tested periodically. The results show that the MSA bath according to the present invention is active even after 61 day from initial production.

Example 23

PA and ASA polymers were immersed in the MSA bath according to example 21 and tested for Ni and Cu adhesion. The following results were obtained, Table 10:

| Polymer | Ni adhesion | Cu Adhesion | Adhesion (N/cm) |
|---|---|---|---|
| ASA | Good | Good | 6.9 ± 1.4 |
| PA | Good | Good | 8.9 ± 2.8 |

The results show that the adhesion value of the ASA and PA polymers is higher than requirement of the GMW 14668, that is 4.5N/cm Example 24

This example shows a process of metallization of ABS and PC/ABS. The process conditions are shown in table below, Table 11:

| | Cu plating process datasheet | | | |
|---|---|---|---|---|
| | Bath | T Setpoint (° C.) | Time (min) | Stirring (rpm or airflow) |
| Chemical line | MSA bath according to example 21 | 65 (ABS; 70 (PC/ABS) | 10 | rpm |

-continued

| | Cu plating process datasheet | | | |
|---|---|---|---|---|
| | Bath | T Setpoint (° C.) | Time (min) | Stirring (rpm or airflow) |
| Cu plating process datasheet | 1st rinsing | | 30 sec. | rpm |
| | Preactivator | Room T | 30 sec. | flow |
| | Activator | 35 | 4 | rpm |
| | 2nd Rinsing | | 30 sec. | rpm |
| | Accelerator | 48 | 2.5 | flow |
| | 3rd Rinsing | | 1 | rpm |
| | Electroless-Ni | 32 | 9 | rpm |
| | 4th rinsing | | 30 sec. | rpm |
| | Immersion Cu | Ambient | 1 | rpm |
| Electrolytic | Electrolytic-Cu | 27 | 60 | flow |
| | Voltage (V) | | | Current (A/dm2) |
| | Automatic adjust | | | 4 |

The polymer substrates were produced from dried pellets and injected in plaques shape following recommended process conditions. Samples were passed through the chemical line to get Ni plated plaques. Different plating baths prepared having different components: Preactivator: HCl reagent grade diluted; Activator: Adhemax Activator; Acelerator: Macuplex Ultracell 9369; Nickel electroless: Adhemax LFS; Immersion copper: Adhemax; Electrolytic copper: Cupracid 210

The sample was plated to copper. Ni thickness was measured at 0.08 μm. To measure the adhesion, a peeling test described in the ASTM-B533 was preformed. The peel strength was measured to be about 14N/cm. As detailed in the GMW 14668 the accepted adhesion value should be higher than 9N/cm.

The following numbered paragraphs set out particular combinations of features which are considered relevant to particular embodiments of the present disclosure.

1. An aqueous composition for use in activating surface of a substrate, comprising: a bifunctional molecule, an acid or mixture of acids, and metallic salts and/or organometallic complexes; wherein the bifunctional molecule having the following empiric formula I:

Si(R)$_3$—(CH$_2$)$_n$—R'  (I)

wherein R is a functional or reactive group which is hydrolysable group and is capable of forming a chemical bond or coupling with surface of the substrate, R' is a functional or reactive group capable of forming a chemical bond or coupling with a metal, n is an integer between 1 to 10, preferably n is 3.

2. The aqueous composition according to any of the paragraphs, wherein R is an alkoxy group, preferably methoxy (—O—CH$_3$) or ethoxy (—O—CH$_2$CH$_3$).

3. The aqueous composition according to any of the paragraphs, wherein R' is selected from a group consisting of thiol, amino, vinyl, epoxy, metharcyloxy, mercapto, preferably R' is a —SH or —NH group, more preferably R' is a —SH.

4. The aqueous composition according to any of the paragraphs, wherein the bifunctional molecule has following empiric formula II:

Si(OCH$_3$)$_3$—(CH$_2$)$_n$—SH  (II)

wherein n is an integer between 1 to 10, preferably n is 3.

5. The aqueous composition according to any of the paragraphs, wherein the bifunctional molecule has following empiric formula III:

Si(OCH$_3$)$_3$—(CH$_2$)$_3$—SH

6. The aqueous composition according to any of the paragraphs, wherein the organometallic complex is a binuclear chrome complex surrounded by 4 oxalate molecules having a empiric formula [Cr$_2$(C$_2$O$_4$)$_4$]$^{2-}$.

7. The aqueous composition according to any of the paragraphs, wherein the bifunctional molecule is Si(OCH$_3$)$_3$—(CH$_2$)$_3$—SH and the organometallic complex is a binuclear chrome complex surrounded by 4 oxalate molecules having a empiric formula [Cr$_2$(C$_2$O$_4$)$_4$]$^{2-}$.

8. The aqueous composition according to any of the paragraphs, wherein the mixture of acids comprises sulfuric acid and phosphoric acid.

9. The aqueous composition according to any of the paragraphs, wherein the aqueous composition comprising: the bifunctional molecule having the empiric formula Si(OCH$_3$)$_3$—(CH$_2$)$_n$—SH, wherein n is an integer between 1 to 10, preferably n is 3; phosphoric acid, sulfuric acid, Cr(III) salts, and Oxalic acid.

10. The aqueous composition according to any of the paragraphs, wherein the metal is selected from the group consisting of palladium, copper, nickel, gold, platinum, silver, cobalt, ruthenium, rhodium, rhenium, manganese, chromium, molybdenum, tungsten, niobium, tantalum, titanium, zirconium, hafnium, zinc, cadmium, aluminum, gallium, indium, tin, and silicon, and an alloy of two or more of the above metals, preferably, a palladium-copper alloy or palladium/tin colloid.

11. The aqueous composition according to any of the paragraphs, wherein the concentration of the bifunctional molecule in the aqueous composition is between about 0.17-0.21 g/l.

12. The aqueous composition according to any of the paragraphs, wherein the concentration of the metallic salts or organometallic complexes in the aqueous composition is between about 30-160 mg/l.

13. The aqueous composition according to any of the paragraphs, wherein temperature of the aqueous composition between 40-90° C.

14. A process of activating surface of a substrate, comprising: contacting or immersing the surface of the substrate with the aqueous composition according to according to any of the paragraphs mentioned above.

15. The process according to any of the paragraphs, wherein the activated surface of the substrate is contacted or immersed at least in one of the following baths: a pre-activation bath, an activation bath, an accelerator bath, an electroless nickel bath, an immersion copper bath, and an electrolytic copper bath, or combinations thereof, whereby the surface of the substrate is metalized.

16. The process according to any of the paragraphs, wherein the surface of the substrate is immersed in or contacted with a preactivation bath for about 10 seconds to 2 min, wherein the preactivation bath has a temperature of about 20-25° C.

17. The process according to any of the paragraphs, wherein the substrate is immersed or contacted with the activator bath having a temperature of 20-50° C. for about 2-8 min.

18. The process according to any of the paragraphs, wherein the substrate is immersed or contacted with the accelerator bath having a temperature of 30-60° C. for about 1-5 min.
19. The process according to according to any of the paragraphs, wherein the substrate is immersed or contacted with the electroless nickel bath having a temperature of 20-50° C. for about 5-15 min, optionally 7-10 min.
20. The process according to any of the paragraphs, wherein the substrate is immersed or contacted with the electrolytic copper having a temperature of 20-40° C. for about 40-80 min, optionally, 60-70 min.
21. The process according to any of the paragraphs, wherein the substrate is contacted or immersed in the following baths in consecutive order: the pre-activation bath, the activation bath, the accelerator bath, the electroless nickel bath, the immersion copper bath, and then the electrolytic copper bath.
22. An activated substrate having a surface chemically bonded or coupled to a hydrolyzed silane reactive group of a bifunctional molecule having following empiric formula II:

wherein n is an integer between 1 to 10, preferably, n is 3;
wherein the thiol moiety of the bifunctional molecule is capable of forming a chemical bond or coupling to a metal.
23. An activated substrate produced by a process according to any of the paragraphs.
24. The aqueous composition, the process, and the activated surface of the substrate according to any of the paragraphs, wherein the substrate is a polymeric material.
25. A method of plating nickel on a plastic substrate comprising:
    a. Contacting the plastic substrate with a chemical bath comprising a component selected from the group consisting of: $[Cr_2(C_2O_4)_4]^{2-}$, $Si(OCH_3)_3$—$(CH_2)_n$—SH wherein n is an integer between 1 to 10, preferably n is 3, acids, trace metals, and combinations thereof; and
    b. Contacting the plastic substrate with a chemical bath that comprises electroless Ni.
26. The method of plating nickel according to any of the paragraphs, wherein the chemical bath comprises $[Cr_2(C_2O_4)_4]^{2-}$, $Si(OCH_3)_3$—$(CH_2)_n$—SH, acids, and trace metals, wherein n is an integer between 1 to 10, preferably n is 3.
27. The method of plating nickel according to any of the paragraphs, wherein the chemical bath comprises $[Cr_2(C_2O_4)_4]^{2-}$.
28. The method of plating nickel according to any of the paragraphs, wherein the chemical bath comprises $Si(OCH_3)_3$—$(CH_2)_n$—SH, wherein n is an integer between 1 to 10, preferably n is 3.
29. The method of plating nickel according to any of the paragraphs, wherein the plastic substrate contains a component selected from the group consisting of: SAN, PC/ABS, ABS, PS, ASA, and combinations thereof.
30. The method of plating nickel according to any of the paragraphs, wherein the plastic substrate comprises styrene or acrylonitrile.
31. The method of plating nickel according to any of the paragraphs, wherein the chemical bath is free of Cr(VI) species.
32. The method of plating nickel according to any of the paragraphs, further comprising rinsing the plastic substrate prior to contacting with electroless Ni.
33. The method of plating nickel according to any of the paragraphs, wherein the plastic substrate is not contacted with a neutralization solution.
34. The method of plating nickel according to any of the paragraphs, wherein the plastic substrate is not contacted with a copper solution.

What is claimed is:
1. A process of activating a surface of a substrate, comprising:
    contacting or immersing the surface of the substrate with an aqueous composition comprising:
        a bifunctional molecule, an acid or a mixture of acids, and an organometallic complex; wherein the bifunctional molecule has the following empiric formula I:

wherein
    R is a functional or reactive group which is a hydrolysable group and is capable of forming a chemical bond or coupling with the surface of the substrate,
    R' is a functional or reactive group capable of forming a chemical bond or coupling with a metal, and
    n is an integer between 1 to 10;
wherein the organometallic complex is a binuclear chrome complex surrounded by 4 oxalate molecules having an empiric formula $[Cr_2(C_2O_4)_4]^{2-}$.
2. The process according to claim 1, wherein R is an alkoxy group.
3. The process according to claim 1, wherein R' is selected from a group consisting of thiol, amino, vinyl, epoxy, methacryloxy, mercapto.
4. The process according to claim 1, wherein the bifunctional molecule has the following empiric formula II:

wherein n is an integer between 1 to 10.
5. The process according to claim 1, wherein the bifunctional molecule has the following empiric formula III:

6. The process according to claim 1, wherein the mixture of acids comprises sulfuric acid and phosphoric acid.
7. The process according to claim 1, wherein the aqueous composition comprises the bifunctional molecule having the empiric formula $Si(OCH_3)_3$—$(CH_2)_n$—SH, wherein n is an integer between 1 to 10, phosphoric acid, sulfuric acid, and Oxalic acid.
8. The process according to claim 1, wherein the metal is selected from the group consisting of palladium, copper, nickel, gold, platinum, silver, cobalt, ruthenium, rhodium, rhenium, manganese, chromium, molybdenum, tungsten, niobium, tantalum, titanium, zirconium, hafnium, zinc, cadmium, aluminum, gallium, indium, tin, and silicon, and an alloy of two or more of the above metals.
9. The process according to claim 1, wherein the concentration of the bifunctional molecule in the aqueous composition is between about 0.17-0.21 g/l.
10. The process according to claim 1, wherein the concentration of the metallic salts or organometallic complexes in the aqueous composition is between about 30-160 mg/l.

11. The process according to claim 1, wherein temperature of the aqueous composition is between 40-90° C.

12. The process according to claim 1, wherein the activated surface of the substrate is contacted or immersed at least in one of the following baths: a pre-activation bath, an activation bath, an accelerator bath, an electroless nickel bath, an immersion copper bath, and an electrolytic copper bath, or combinations thereof, whereby the surface of the substrate is metalized.

13. The process according to claim 12, wherein the surface of the substrate is immersed in or contacted with the preactivation bath for about 10 seconds to 2 min, wherein the preactivation bath has a temperature of about 20-25° C.

14. The process according to claim 12, wherein the substrate is immersed or contacted with the activation bath having a temperature of 20-50° C. for about 2-8 min.

15. The process according to claim 12, wherein the substrate is immersed or contacted with the accelerator bath having a temperature of 30-60° C. for about 1-5 min.

16. The process according to claim 12, wherein the substrate is immersed or contacted with the electroless nickel bath having a temperature of 20-50° C. for about 5-15 min.

17. The process according to claim 12, wherein the substrate is immersed or contacted with the electrolytic copper bath having a temperature of 20-40° C. for about 40-80 min.

18. The process according to claim 12, wherein the substrate is contacted or immersed in the following baths in consecutive order: the pre-activation bath, the activation bath, the accelerator bath, the electroless nickel bath, the immersion copper bath, and then the electrolytic copper bath.

19. The process according to claim 1, wherein the substrate is a polymeric material.

20. A process of activating a surface of a substrate, comprising:
contacting or immersing the surface of the substrate with an aqueous composition comprising:
a bifunctional molecule, an acid or a mixture of acids, and an organometallic complex; wherein the bifunctional molecule has the following empiric formula I:

$$Si(R)_3\text{---}(CH_2)_n\text{---}R' \quad (I)$$

wherein
R is a functional or reactive group which is a hydrolysable group and is capable of forming a chemical bond or coupling with the surface of the substrate,
R' is a functional or reactive group capable of forming a chemical bond or coupling with a metal, and
n is an integer between 1 to 10;
wherein the organometallic complex is a binuclear chrome complex surrounded by 4 oxalate molecules;
wherein the bifunctional molecule is $Si(OCH_3)_3\text{---}(CH_2)_3\text{---}SH$ and the organometallic complex is a binuclear chrome complex surrounded by 4 oxalate molecules having an empiric formula $[Cr_2(C_2O_4)_4]^{2-}$.

21. The process according to claim 1, further comprising a metallic salt.

* * * * *